United States Patent
Li (10) Patent No.: US 10,505,720 B2
(45) Date of Patent: Dec. 10, 2019

(54) BLOCKCHAIN SYSTEM AND DATA STORAGE METHOD AND APPARATUS

(71) Applicant: ALIBABA GROUP HOLDING LIMITED, Grand Cayman (KY)

(72) Inventor: Ning Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/513,432

(22) Filed: Jul. 16, 2019

(65) Prior Publication Data

US 2019/0342078 A1 Nov. 7, 2019

Related U.S. Application Data

(63) Continuation of application No. PCT/CN2018/076505, filed on Feb. 12, 2018.

(30) Foreign Application Priority Data

Feb. 17, 2017 (CN) .......................... 2017 1 0086153

(51) Int. Cl.
*H04L 29/06* (2006.01)
*H04L 9/06* (2006.01)
(Continued)

(52) U.S. Cl.
CPC .......... *H04L 9/0643* (2013.01); *H04L 9/0637* (2013.01); *H04L 9/3236* (2013.01); *H04L 67/1095* (2013.01); *H04L 2209/38* (2013.01)

(58) Field of Classification Search
CPC ... H04L 9/0637; H04L 9/0643; H04L 9/3236; H04L 67/1095; H04L 2209/38
(Continued)

(56) References Cited

U.S. PATENT DOCUMENTS

| 9,824,031 B1 | 11/2017 | Ganti et al. |
| 10,026,118 B2 | 7/2018 | Castinado et al. |

(Continued)

FOREIGN PATENT DOCUMENTS

| CN | 105844505 A | 8/2016 |
| CN | 105959307 A | 9/2016 |

(Continued)

OTHER PUBLICATIONS

Cachin, Christian, Marko Vukolic Sorniotti, and Thomas Weigold. "Blockchain, cryptography, and consensus." (2016). (Year: 2016).*
(Continued)

*Primary Examiner* — Syed A Zaidi (57) ABSTRACT

Methods, systems, and apparatus, including computer programs encoded on computer storage media, for storing data are provided. One of the methods includes: receiving, by one or more computing devices, a transaction request from a first node, the transaction request comprising transaction data; determining, by the one or more computing devices based on the transaction data, a blockchain network corresponding to the transaction request from a plurality of blockchain networks connected to the one or more computing devices, wherein the first node is excluded from a consensus process associated with the determined blockchain network; forwarding, by the one or more computing devices, the transaction request to the determined blockchain network; receiving, by the one or more computing devices from the determined blockchain network, a block generated based on consensus validation on the transaction request; and forwarding, by the one or more computing devices, the block to the first node.

20 Claims, 4 Drawing Sheets

(51) Int. Cl.
*H04L 9/32* (2006.01)
*H04L 29/08* (2006.01)

(58) Field of Classification Search
USPC .......................................................... 713/189
See application file for complete search history.

(56) References Cited

U.S. PATENT DOCUMENTS

| | | | |
|---|---|---|---|
| 10,142,312 B2 | 11/2018 | Johnsrud et al. | |
| 10,198,325 B2 | 2/2019 | Davis | |
| 10,291,627 B2 | 5/2019 | Gleichauf | |
| 2015/0170112 A1* | 6/2015 | DeCastro | G06Q 20/381 |
| | | | 705/39 |
| 2015/0332283 A1* | 11/2015 | Witchey | G06F 21/645 |
| | | | 705/3 |
| 2015/0363777 A1* | 12/2015 | Ronca | G06Q 20/401 |
| | | | 705/75 |
| 2016/0203477 A1* | 7/2016 | Yang | G06Q 20/3678 |
| | | | 705/69 |
| 2016/0292672 A1* | 10/2016 | Fay | G06Q 20/363 |
| 2016/0300222 A1* | 10/2016 | Yang | G06Q 20/3678 |
| 2016/0321654 A1 | 11/2016 | Lesavich et al. | |
| 2016/0342978 A1* | 11/2016 | Davis | G06Q 20/02 |
| 2017/0046651 A1 | 2/2017 | Lin et al. | |
| 2017/0083860 A1* | 3/2017 | Sriram | H04L 63/126 |
| 2017/0103390 A1 | 4/2017 | Wilson, Jr. et al. | |
| 2017/0116693 A1 | 4/2017 | Rae et al. | |
| 2017/0132615 A1* | 5/2017 | Castinado | G06Q 20/4014 |
| 2017/0154331 A1* | 6/2017 | Voorhees | G06Q 20/3829 |
| 2017/0228734 A1* | 8/2017 | Kurian | G06Q 10/105 |
| 2017/0232300 A1 | 8/2017 | Tran et al. | |
| 2017/0243213 A1 | 8/2017 | Castinado et al. | |
| 2017/0243222 A1* | 8/2017 | Balasubramanian | ........................ |
| | | | G06Q 20/4016 |
| 2017/0243287 A1* | 8/2017 | Johnsrud | G06Q 40/025 |
| 2017/0244707 A1* | 8/2017 | Johnsrud | H04L 63/08 |
| 2017/0344435 A1* | 11/2017 | Davis | G06F 11/1464 |
| 2017/0344987 A1* | 11/2017 | Davis | H04L 63/06 |
| 2018/0075453 A1 | 3/2018 | Durvasula et al. | |
| 2018/0075527 A1 | 3/2018 | Nagla et al. | |
| 2018/0123779 A1 | 5/2018 | Zhang | |
| 2018/0225448 A1 | 8/2018 | Russinovich et al. | |
| 2018/0227275 A1* | 8/2018 | Russinovich | H04L 63/0435 |
| 2018/0285879 A1 | 10/2018 | Gadnis et al. | |
| 2019/0139047 A1* | 5/2019 | Ronnow | G06F 21/6209 |
| 2019/0147190 A1* | 5/2019 | Marin | G06F 21/31 |
| | | | 713/189 |
| 2019/0305937 A1* | 10/2019 | Baykaner | G06F 16/2246 |

FOREIGN PATENT DOCUMENTS

| | | |
|---|---|---|
| CN | 106101242 A | 11/2016 |
| CN | 106157142 A | 11/2016 |
| CN | 106302328 A | 1/2017 |
| CN | 107018125 A | 8/2017 |
| KR | 20160150278 A | 12/2016 |
| WO | 2018090331 A1 | 5/2018 |

OTHER PUBLICATIONS

Office Action and Search Report for Taiwanese Application No. 106139678 dated Jun. 18, 2019.
International Preliminary Report on Patentability Chapter I dated Aug. 29, 2019, issued in related International Application No. PCT/CN2018/076505 (12 pages).
First Office Action dated Jan. 28, 2019, issued in related Chinese Application No. 201710086153.6 (11 pages), with English machine translation.
First Search dated Jan. 10, 2019, issued in related Chinese Application No. 201710086153.6 (2 pages).
Second Office Action dated May 8, 2019, issued in related Chinese Application No. 201710086153.6 (7 pages), with English machine translation.
Notification to Grant Patent Right for Invention dated Jun. 6, 2019, issued in related Chinese Application No. 201710086153.6 (9 pages), with English machine translation.
PCT International Search Report and the Written Opinion dated May 9, 2018, issued in related International Application No. PCT/CN2018/076505 (10 pages).
Office Action for Canadian Patent Application No. 3051025 dated Aug. 19, 2019 (4 pages).
Grant of Patent for Korean Application No. 10-2019-7023160 dated Oct. 15, 2019 with English machine translation (2 pages).

* cited by examiner

BLOCKCHAIN SYSTEM AND DATA STORAGE METHOD AND APPARATUS

CROSS-REFERENCE TO RELATED APPLICATIONS

This application is a continuation application of International Application No. PCT/CN2018/076505, filed on Feb. 12, 2018, which is based on and claims priority to and benefits of Chinese Patent Application No. 201710086153.6 filed with the State Intellectual Property Office (SIPO) of the People's Republic of China on Feb. 17, 2017. The entire contents of the above-identified applications are incorporated herein by reference.

TECHNICAL FIELD

This application relates to the field of software technologies, and in particular, to a blockchain system and a data storage method and apparatus.

BACKGROUND

Blockchain network is an Internet database characterized by decentralization, transparency, and synchronization of database records (i.e., a shared ledger) by all nodes.

In one example, a blockchain network consists of various nodes, each node holding a shared ledger. Data associated with blocks are chronologically recorded on the shared ledger (data associated with a block corresponds to a set of transactions for which consensus regarding legitimacy is reached by all nodes during a period of time). In other words, the shared ledger records a timed chain of blocks of data, hence named "blockchain." Each node may synchronize the shared ledger and validate the authenticity of each transaction.

In addition, any node has a right to suggest addition of a block of data to the shared ledger. All nodes may reach consensus regarding whether transactions corresponding to the block of data suggested to be added is legitimate, and add the block of data for which a consensus regarding legitimacy is reached into the shared ledger. There are mainly two types of blockchain networks now: public blockchain networks and consortium blockchain networks.

A public blockchain network is completely decentralized and transparent to the public. Any entity (individual or organization) may become a node in the public blockchain network and participate in transaction validation associated with the public blockchain network, which means that any entity may hold the shared ledger by becoming a node and request all nodes to reach a consensus on a block of data and record the block of data on the shared ledger.

However, since any entity may become a node in a public blockchain network, a hacker may easily intrude into the public blockchain network and attempt to control a majority of the nodes, add illegitimate blocks of data to the public blockchain (i.e., the shared ledger), and pose a threat to the security of the public blockchain network. In addition, any entity may view all transaction data stored on the public chain, while the transaction data often involve privacy of the node and non-node entities. Even if the transaction data is encrypted, there is still a risk for the encryption to be cracked.

A consortium blockchain network is partially decentralized and is not open to the public. Only a pre-designated entity may become a node in the consortium blockchain network, while other entities are not qualified to become nodes, nor can they hold the shared ledger or participate in consensus. The consortium blockchain network may provide services to entities outside the consortium blockchain network (non-node entities). A non-node entity may interface with the consortium blockchain network and request the consortium blockchain network to reach a consensus regarding legitimacy of a transaction generated by the non-node entity.

One consortium blockchain network often only relates to one transaction field. Nodes in a consortium blockchain network are often authoritative institutions in the field. For example, nodes in a consortium blockchain network in the financial field are often big banks and financial regulatory institutions. In addition, nodes in consortium blockchain networks for many transaction fields, such as bills, logistics, healthcare, government and administration, are also authoritative institutions in corresponding fields, respectively. Such characteristic of the consortium blockchain network gives hackers no opportunity to participate in consensus validation or to view transaction data stored on the consortium blockchain. This way, the security of the blockchain network is greatly improved. However, since nodes in a consortium blockchain network are often authoritative institutions in a transaction field, the consortium blockchain network can only provide public validation services in the particular transaction field. A non-node entity often needs to spend a very high cost to interface with consortium blockchain networks in different transaction fields, which is very inconvenient.

A non-node entity needs to select a corresponding consortium blockchain network according to a transaction field to which a transaction generated by the non-node entity belongs. Only after the non-node entity interfaces with a consortium blockchain network, can the non-node entity enjoy services provided by the consortium blockchain network. However, consortium blockchain networks may have different interfacing protocols. If a plurality of transactions generated by the non-node entity belong to different transaction fields, the non-node entity has to interface with a plurality of consortium blockchain networks according to different interfacing protocols, respectively, which is not convenient for the non-node entity.

SUMMARY

Some embodiments disclosed herein provide a blockchain system and a data storage method and apparatus that provide security and convenience for blockchain networks.

In some embodiments, a blockchain system may include a distribution center, a non-consensus subsystem, and a plurality of consensus subsystems. The non-consensus subsystem may include a plurality of non-consensus nodes. Each of the consensus subsystems may include a plurality of consensus nodes. A non-consensus node of the non-consensus subsystem may send a transaction request to the distribution center. The distribution center may receive the transaction request from the non-consensus subsystem, determine a consensus subsystem corresponding to the transaction request based on the transaction data comprised in the transaction request, and forward the transaction request to the determined consensus subsystem. The consensus subsystem may receive the transaction request forwarded by the distribution center and send the transaction request to all consensus nodes in the consensus subsystem for consensus validation. If the validation is successful, the consensus subsystem may generate a corresponding block according to the transaction request and store the block into a consortium blockchain corresponding to the consensus subsystem.

Some embodiments provide a data storing method. A blockchain system may include a distribution center, a non-consensus subsystem, and a plurality of consensus subsystems. The non-consensus subsystem may include a plurality of non-consensus nodes. Each of the consensus subsystems may include a plurality of consensus nodes. The method may include receiving, by the consensus subsystem, a transaction request forwarded by the distribution center, the transaction request comprising transaction data and sending the transaction request to all consensus nodes in the consensus subsystem for consensus validation. The method may further include, if the validation is successful, generating a corresponding block according to the transaction request and storing the block into a consortium blockchain corresponding to the consensus subsystem.

Other embodiments provide a data storing method. A blockchain system may include a distribution center, a non-consensus subsystem, and a plurality of consensus subsystems. The non-consensus subsystem may include a plurality of non-consensus nodes. Each of the consensus subsystems may include a plurality of consensus nodes. The method may include receiving, by the distribution center, a transaction request sent by the non-consensus subsystem, the transaction request comprising transaction data and determining a consensus subsystem corresponding to the transaction request based on the transaction data comprised in the transaction request. The method may further include forwarding the transaction request to the determined consensus subsystem, causing the consensus subsystem to perform consensus validation on the transaction request and store a block corresponding to the validated transaction request into a consortium blockchain corresponding to the consensus subsystem.

Still other embodiments provide a data storing method. A blockchain system may include a distribution center, a non-consensus subsystem, and a plurality of consensus subsystems. The non-consensus subsystem may include a plurality of non-consensus nodes. Each of the consensus subsystems may include a plurality of consensus nodes. The method may include sending, by the non-consensus subsystem, a transaction request to the distribution center. The transaction request may include transaction data and may cause the distribution center to forward, based on the transaction data, the transaction request to a consensus subsystem corresponding to the transaction data.

Some embodiments provide a data storing apparatus. A blockchain system may include a distribution center, a non-consensus subsystem, and a plurality of pieces of the apparatus. The non-consensus subsystem may include a plurality of non-consensus nodes. Each piece of the apparatus may include a plurality of consensus nodes. The apparatus may include a receiving module configured to receive a transaction request forwarded by the distribution center, the transaction request including transaction data. The apparatus may also include a validation module configured to send the transaction request to all consensus nodes in the consensus subsystem for consensus validation. The apparatus may further include a storing module configured to, if the validation is successful, generate a corresponding block according to the transaction request and store the block into a consortium blockchain corresponding to the consensus subsystem.

Other embodiments provide a data storing apparatus. A blockchain system may include the apparatus, a non-consensus subsystem, and a plurality of consensus subsystems. The non-consensus subsystem may include a plurality of non-consensus nodes. Each of the consensus subsystems may include a plurality of consensus nodes. The apparatus may include a receiving module configured to receive a transaction request sent by the non-consensus subsystem, the transaction request comprising transaction data, and a determining module configured to determine a consensus subsystem corresponding to the transaction request based on the transaction data comprised in the transaction request. The apparatus may further include a forwarding module configured to forward the transaction request to the determined consensus subsystem, which may cause the consensus subsystem to perform consensus validation on the transaction request and store a block corresponding to the validated transaction request into a consortium blockchain corresponding to the consensus subsystem.

Yet other embodiments provide a data storing apparatus. A blockchain system may include a distribution center, the apparatus, and a plurality of consensus subsystems. The apparatus may include a plurality of non-consensus nodes. Each of the consensus subsystems may include a plurality of consensus nodes. The apparatus may include a sending module configured to send a transaction request to the distribution center. The transaction request may include transaction data and may cause the distribution center to forward, based on the transaction data, the transaction request to a consensus subsystem corresponding to the transaction data.

In some embodiments, the specification provides a computer-implemented method for storing data. The method may include receiving, by one or more computing devices, a transaction request from a first node. The transaction request may include transaction data. The method may also include determining, by the one or more computing devices based on the transaction data, a blockchain network corresponding to the transaction request from a plurality of blockchain networks connected to the one or more computing devices. The first node may be excluded from a consensus process associated with the determined blockchain network. The method may further include forwarding, by the one or more computing devices, the transaction request to the determined blockchain network, receiving, by the one or more computing devices from the determined blockchain network, a block generated based on consensus validation on the transaction request, and forwarding, by the one or more computing devices, the block to the first node.

According to some embodiments, the determined blockchain network may correspond to a consortium blockchain.

In the embodiments of the specification, the method may further include validating, by a node associated with the determined blockchain network, the transaction request forwarded by the one or more computing devices, generating, by the node associated with the determined blockchain network, the block associated with the transaction request, and adding, by the node associated with the determined blockchain network, the generated block to a blockchain associated with the determined blockchain network.

In some embodiments, the method may further include performing, by the determined blockchain network, the consensus validation on the transaction request forwarded by the one or more computing devices, generating, by the determined blockchain network, the block associated with the transaction request, and adding, by the determined blockchain network, the generated block to a blockchain associated with the determined blockchain network.

According to some embodiments, the method may further include storing, by the first node, information associated with the block to a public blockchain.

In the embodiments of the specification, the method may further include receiving, by the one or more computing devices, a transaction digest corresponding to the block from the determined blockchain network and forwarding, by the one or more computing devices, the transaction digest to the first node.

In some embodiments, the method may further comprise storing, by the first node, information associated with the transaction digest to a public blockchain.

According to some embodiments, the method may further comprise receiving, by the one or more computing devices, a search request for transaction data from the first node, determining, by the one or more computing devices, a search permission associated with the first node based on the search request, obtaining, by the one or more computing devices from the determined blockchain network, transaction data corresponding to the search permission, and sending, by the one or more computing devices, the obtained transaction data to the first node.

In the embodiments of the specification, the determining a search permission associated with the first node may include determining a type of the first node and assigning the search permission to the first node based on the determined type.

According to some embodiments, the specification provides a system for storing data. The system may include a processor and a non-transitory computer-readable storage medium storing instructions executable by the processor to cause the system to perform operations. The operations may include: receiving a transaction request from a first node, the transaction request comprising transaction data; determining, based on the transaction data, a blockchain network corresponding to the transaction request from a plurality of blockchain networks connected to the one or more computing devices, wherein the first node is excluded from a consensus process associated with the determined blockchain network; forwarding the transaction request to the determined blockchain network; receiving, from the determined blockchain network, a block generated based on consensus validation on the transaction request; and forwarding the block to the first node.

In some embodiments, the specification provides a non-transitory computer-readable storage medium for storing data. The non-transitory computer-readable storage medium may be configured with instructions executable by one or more processors to cause the one or more processors to perform operations. The operations may include: receiving a transaction request from a first node, the transaction request comprising transaction data; determining, based on the transaction data, a blockchain network corresponding to the transaction request from a plurality of blockchain networks connected to the one or more computing devices, wherein the first node is excluded from a consensus process associated with the determined blockchain network; forwarding the transaction request to the determined blockchain network; receiving, from the determined blockchain network, a block generated based on consensus validation on the transaction request; and forwarding the block to the first node.

In some embodiments disclosed herein, a blockchain system including a distribution center, a non-consensus subsystem, and a plurality of consensus subsystems is contemplated. The non-consensus subsystem may include a plurality of non-consensus nodes. Each of the consensus subsystems may include a plurality of consensus nodes. In some embodiments, each of the consensus subsystems may correspond to a consortium blockchain network containing the plurality of consensus nodes. Different consensus subsystems may perform consensus validations for transaction in different fields. Non-consensus nodes in the non-consensus subsystem may send transaction requests to the distribution center. The distribution center may determine a consensus subsystem for validating transactions a particular field based on the transaction data in the transaction request and forward the transaction request to the consensus subsystem. Then the consensus subsystem may perform consensus validation on the transaction request. In some embodiments, only the consensus nodes are responsible for consensus validation, while non-consensus nodes outside the consensus subsystems cannot participate in consensus validation of a consortium blockchain network. This improves the security of the blockchain network. At the same time, the distribution center may interface with various consortium blockchain networks. Non-consensus entities (non-consensus nodes) outside the consortium blockchain networks may only need to interface with the distribution center and not need to interface with a plurality of consortium blockchain networks according to different interfacing protocols. This improves the convenience of using the blockchain network.

BRIEF DESCRIPTION OF THE DRAWINGS

The accompanying drawings here are included into and constitute a part of the Description, show embodiments conforming to the specification, and are used together with the Description to explain the principles of the specification.

DETAILED DESCRIPTION

The embodiments provide a blockchain network and a data storage method and apparatus.

To enable one of ordinary skill in the art to better understand the technical solutions of the specification, the technical solutions will be described below with reference to the accompanying drawings in the embodiments of the specification. On the basis of the embodiments of the specification, all other embodiments obtainable by one of ordinary skill in the art without creative effort shall fall within the scope of the specification.

Some embodiments provide a blockchain system, and a distribution center is established in the system. The distribution center provides interfacing standard protocols for, on one hand, interfacing with non-node entities to accept transaction requests from the non-node entities, and on the other hand, interfacing with various consortium blockchain networks to forward the received transaction requests to corresponding consortium blockchain networks for validation according to the transaction fields corresponding to the transaction requests.

The blockchain system in the technical solution of the specification may incorporate existing consortium blockchain networks that operate independently and non-node entities in need of various consensus validation services in a unified system architecture, provide interfacing standard protocols for the consortium blockchain networks and non-node entities, and even include various validation services in the entire society in the blockchain system. All members in the society may become nodes in the blockchain system (no need to be responsible for consensus validation), and transaction requests generated in all aspects of life and work of each member may be validated in the blockchain system.

Figure 1A:
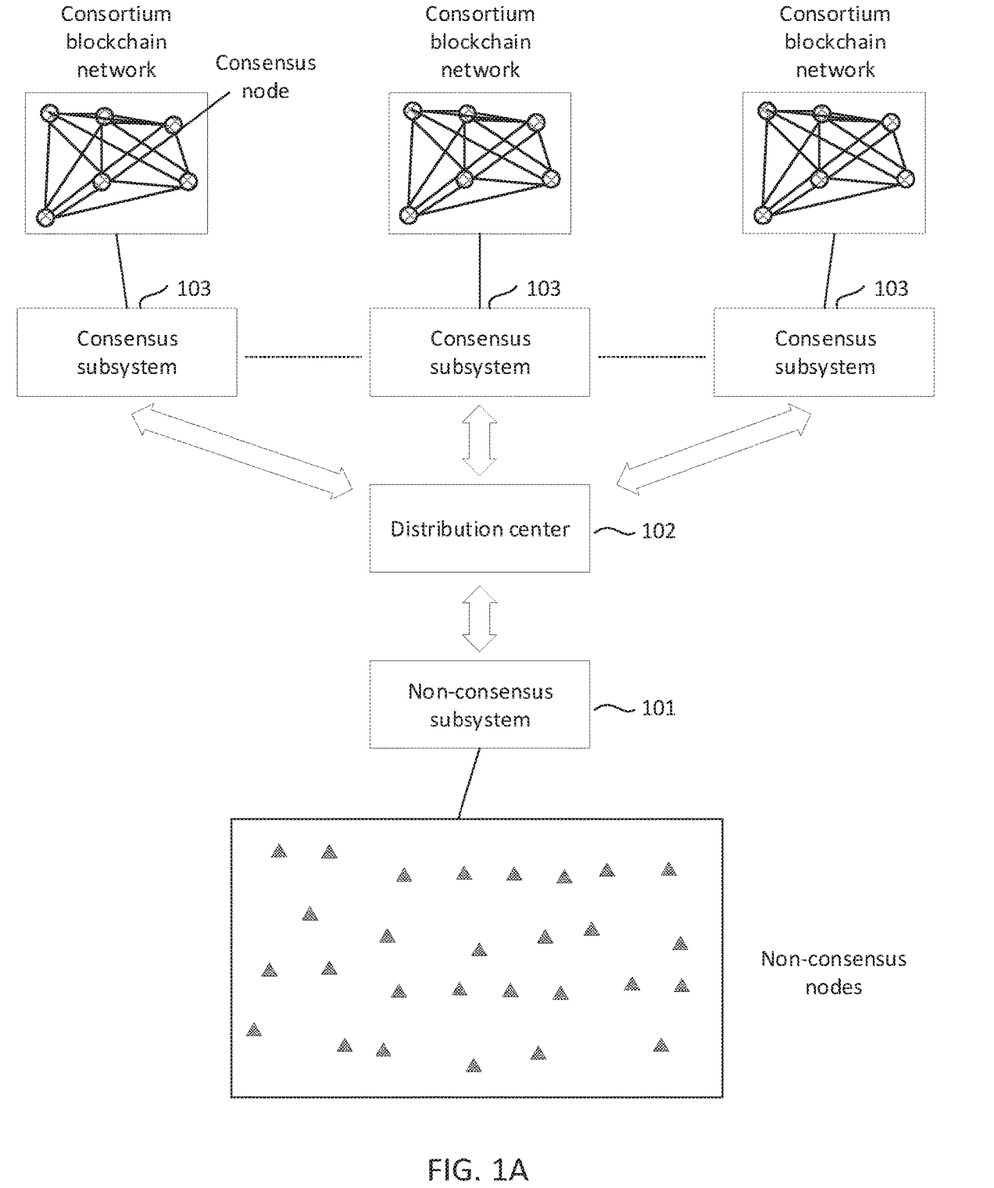
FIG. 1A illustrates a schematic diagram of a blockchain system.

FIG. 1A illustrates a schematic diagram of a blockchain system. As shown in FIG. 1A, the blockchain system comprises a distribution center, a non-consensus subsystem, and a plurality of consensus subsystems. In some embodiments, each of the consensus subsystems may correspond to a consortium blockchain network. The consensus nodes in each of the consensus subsystems may be nodes in the consortium blockchain network corresponding to the consensus subsystem. The consensus nodes may refer to nodes participating in consensus processes associated with the consortium blockchain network. The non-consensus subsystem may correspond to a plurality of non-node entities, which may refer to entities that are not nodes of the consortium blockchain network or entities that do not participate in consensus processes of the consortium blockchain network. The non-node entities can serve as non-consensus nodes in the non-consensus subsystem. In some embodiments, the non-consensus subsystem may correspond to a public blockchain network. The non-consensus nodes in the non-consensus subsystem may be nodes in the public blockchain network. Although the non-consensus nodes cannot participate in the consensus processes of the consortium blockchain networks, they can submit transaction requests to the consortium blockchain networks for the consensus nodes to validate. In some embodiments, transaction requests initiated by the non-consensus nodes may be allocated by the distribution center in a uniform manner. The distribution center may forward transaction requests corresponding to different transaction fields to corresponding consensus subsystems (i.e., equivalent to forwarding the transaction requests to corresponding consortium blockchain networks).

As an example, one or more computing devices associated with the distribution center may receive a transaction request from a first node that is a non-consensus node. The transaction request may include transaction data. The one or more computing devices may determine a blockchain network corresponding to the transaction request from a plurality of blockchain networks connected to the one or more computing devices. Here, the determined blockchain network may be a consortium blockchain network in a field corresponding to the field of the transaction request. The first node may be excluded from a consensus process associated with the consortium blockchain network. The one or more computing devices may then forward the transaction request to one or more second nodes associated with the determined blockchain network. The second nodes may be nodes of the determined consortium blockchain network. They may be consensus nodes that participate in the consensus processes of the consortium blockchain network.

In fact, when a consensus validation system of the entire society is based on the blockchain system, the consortium blockchain networks may be deemed as service stations for providing services to each society member. For each society member, there are many transaction requests generated by the society member in social activities due to life or work, which spans a plurality of transaction fields, and the blockchain system may provide one-stop services to the society member. In addition, transaction data stored on the blockchain system also encompasses all aspects of social activities of each society member, including finance, healthcare, education, insurance, shopping, and asset liquidation of the society member, as well as fields such as administration, judiciary, enforcement, etc. The transaction data may serve as big data with very high accuracy for further construction of a credit system for the entire society.

The technical solutions of the embodiments of the specification will be described in detail with reference to the accompanying drawings.

FIG. 1A illustrates a schematic diagram of a blockchain system. The blockchain system may include a non-consensus subsystem 101, a distribution center 102, and a plurality of consensus subsystems 103. The non-consensus subsystem 101 may comprise a plurality of non-consensus nodes. Each of the consensus subsystems may comprise a plurality of consensus nodes. In some embodiments, a non-consensus node may send a transaction request to the distribution center 102 The distribution center 102 may receive the transaction request from the non-consensus subsystem, determine a consensus subsystem corresponding to the transaction request based on the transaction data comprised in the transaction request, and forward the transaction request to the determined consensus subsystem 103. In some embodiments, the consensus subsystem may correspond to a blockchain network (e.g., a consortium blockchain network). Then, the consensus subsystem 103 may receive the transaction request forwarded by the distribution center. It may send the transaction request to all consensus nodes in the consensus subsystem 103 for consensus validation. In some embodiments, the consensus nodes may correspond to nodes of the determined blockchain network. If the validation is successful, the consensus subsystem 103 may generate a corresponding block according to the transaction request and store the block into a consortium blockchain corresponding to the consensus subsystem 103. The block may be generated by one or more nodes associated with the determined blockchain network. After the nodes validated the block, they may add the block to their correspond blockchain.

In some embodiments, the consensus subsystem 103 may further be configured to send the block corresponding to the transaction request to the non-consensus subsystem 101.

In some embodiments, the non-consensus subsystem 101 may receive the block and store the block into a public blockchain corresponding to the non-consensus subsystem 101. As an example, a first node that is a non-consensus node of the non-consensus subsystem 101, may generate one or more transactions comprising information associated with the block and broadcast the transactions for adding to a public blockchain, of which the first node is a node.

In some embodiments, the consensus subsystem 103 may further be configured to generate a transaction digest corresponding to the block based on the transaction data corresponding to the block and send the transaction digest to the non-consensus subsystem 101.

In some embodiments, the non-consensus subsystem 101 may store the transaction digest into the public blockchain such that the transaction digest is available for search by the non-consensus nodes. As an example, a first node that is a non-consensus node of the non-consensus subsystem 101 may generate one or more transactions comprising information associated with the transaction digest and broadcast the transactions for adding to a public blockchain, of which the first node is a node.

In some embodiments, the non-consensus subsystem 101 may further comprise a data browser configured to receive a search request for transaction data from a non-consensus node, determine search permission of the non-consensus node according to the search request, and return, according to the search permission, transaction data corresponding to the search permission to the non-consensus node. The data browser may obtain, according to the search permission, transaction data corresponding to the search permission from the consensus subsystem 103 corresponding to the search request and return the obtained transaction data to the non-consensus nodes.

In an existing blockchain network, nodes are members of the blockchain network. The nodes may participate in consensus validation on a transaction request, may also search blocks stored on the blockchain network (i.e., the shared ledger), and may further search transaction data respectively corresponding to the blocks. The transaction request comprises transaction data, and a node or non-node entity may submit a transaction request to request the blockchain network to perform consensus validation on the transaction request and to verify whether transaction data of the transaction request is legitimate.

Here, the transaction data is transaction data generated by a node or non-node entity and comprises digital signature, identifier, account address, etc. of the node or non-node entity, and further comprises matters to be verified as requested by the node or non-node entity. These matters to be verified vary depending on different transaction fields. For example, a node A transfers 500 Yuan to a node B. To make the node B to believe that the transfer has been made, node A will submit a transaction request, and the transaction request comprises the following transaction data: account address of node A, account address of node B, and "A transfers 500 Yuan to B." Then, nodes in the blockchain network need to verify whether 500 Yuan is deducted from the account of node A, and whether 500 Yuan from the account of node A is added into the account of B.

In the field of blockchain technologies, consensus validation is performed on a transaction request by all nodes according to a consensus algorithm, and the blockchain network has a right to access private information of all nodes, such as accounts, transaction records, etc., for validation.

In an existing blockchain network, there is a great number of transaction requests in need of consensus validation. Therefore, consensus validation is typically performed once on a batch of transaction requests within a period of time or when the number of transaction requests as a batch reaches a number threshold, so as to improve the efficiency. Then, if the validation on this batch of transaction requests is successful, a block corresponding to this batch of transaction requests is generated and stored in the blockchain (i.e., stored in the shared ledger). Nodes may search for transaction data corresponding to a block to check whether the block has been tempered with.

In some embodiments, the consensus nodes are not different from the nodes in a consortium blockchain network in terms of functions. One consensus subsystem corresponds to a consortium blockchain network (comprising a consortium blockchain), and each consensus node corresponds to an authoritative institution for participating in consensus validation. The non-consensus nodes may be non-node entities that do not participate in the consensus process for a consortium blockchain. They may be assigned a node identity in the present system, but the non-consensus nodes may not participate in consensus validation. The non-consensus nodes may also be nodes in a public blockchain network, meaning that the non-consensus subsystem corresponds to a public blockchain network. These non-consensus nodes may not participate in consensus validation, either. Consensus validation is performed by all consensus nodes in the consensus subsystems.

In some embodiments, the non-consensus nodes may perform consensus validation for public blockchain networks. For example, the non-consensus nodes may be nodes in a bitcoin application scenario that perform consensus validation for the circulation of bitcoins according to a Proof of Work algorithm. As described above, the entire society may be incorporated into a unified credit system on the basis of the present system. When the non-consensus subsystem corresponds to a public blockchain network, the public blockchain network just needs to interface with the present system, while the original operations of the public blockchain network will not be affected.

Furthermore, the non-consensus subsystem in the present system may further correspond to a plurality of public blockchain networks. However, in the present system, all nodes comprised in the plurality of public blockchain networks are non-consensus nodes, and the non-consensus subsystem does not care which public blockchain network these non-consensus nodes originally belong to.

In some embodiments, the distribution center provides interfacing standard protocols to the public. In one example, each consortium blockchain network may develop a client having the standard protocols built-in according to an application program interface (API) provided by the distribution center for interfacing with the distribution center and thereby becoming a consensus subsystem. In addition, any entity may interface with the distribution center and become a non-consensus node. In one example, a person or individual may install a client having the interfacing standard protocol built-in on a terminal, and then transaction requests may be submitted at any time through the client. An enterprise, in particular an enterprise that provides services to users, may interface the enterprise's application with the distribution center. When the enterprise provides a service to a user, a transaction request corresponding to the service may be submitted for a corresponding consensus subsystem to perform consensus validation.

For example, Mr. Zhang is a philanthropist who often provides financial assistance to impoverished students. Mr. Zhang is very concerned with the fate of each donation he made and whether students have truly received the donations. Then, Mr. Zhang may apply to become a non-consensus node and install a payment application with a built-in interfacing standard protocol. Every time when Mr. Zhang makes a donation, a corresponding consensus subsystem in the charity field will perform consensus validation on the donation to ensure that the donation made by Mr. Zhang is wired into an account of a designated impoverished student. Moreover, Mr. Zhang can confirm later that the transaction is not tempered with by viewing the block stored into the consortium blockchain.

For example, a client of an e-commerce platform may have a built-in interfacing standard protocol for interfacing with the distribution center. When a user buys on the e-commerce platform, the e-commerce platform requests a consensus subsystem to perform consensus validation on whether the goods purchased by the user is authentic, whether the payment made by the user is successful, etc., and provides feedback to the user.

For example, an ordinary individual may become a non-consensus node. When two non-consensus nodes conduct a transfer, one of the non-consensus nodes may initiate a transaction request to request a consortium blockchain network corresponding to the payment field to perform consensus validation on the transfer and record a block corresponding to the transfer on a consortium blockchain.

In summary, there are abundant application scenarios under the architecture of the present system. An individual may become a non-consensus node to request validation on various events generated by the individual. An enterprise may become a non-consensus node to enhance trust that users have on the enterprise.

In some embodiments, when the non-consensus subsystem corresponds to a public blockchain network, the generated block corresponding to the transaction request may further be sent to the non-consensus subsystem, causing the non-consensus subsystem to store the received block into the public blockchain. This way, all non-consensus nodes may conveniently view time chains of transactions and do not need to request a consensus subsystem to search the blocks.

Furthermore, to further facilitate non-consensus nodes to search transaction requests that have been subject to consensus validation, transaction data corresponding to a generated block may be summarized to generate a transaction digest, and the transaction digest may be sent to the non-consensus subsystem. The non-consensus subsystem may store the transaction digest to the public blockchain. This way, the non-consensus nodes may search for the transaction digest to meet search demands in the general sense. Meanwhile, the non-consensus nodes are unable to view the completed transaction data, which prevents users with unlawful intent from using certain private data. By sending the block and transaction digest to the non-consensus subsystem for storage, it is ensured that the non-consensus subsystem does not face a risk of being invaded, while the openness of the blockchain network is achieved.

In some embodiments, the non-consensus subsystem may further comprise a data browser. The data browser has a function to provide data search and permission management capabilities for the non-consensus nodes. As described above, the block and transaction digest are sent to the non-consensus subsystem for storage. Under normal circumstances, the non-consensus nodes may learn about information such as whether consensus validation is successful, what matters have been verified, etc., by searching for the block and transaction digest stored on the public chain. In some cases, if a non-consensus node suspects that a block is tempered with, the suspicion can be confirmed only by searching for the transaction data corresponding to the block. In other cases, if a non-consensus node needs to prove the node's credit to other non-consensus nodes, the non-consensus node also needs to present some detailed transaction data to other non-consensus nodes. However, it would lead to a high risk in security if non-consensus nodes are allowed to directly view all transaction data stored on a consortium blockchain. Therefore, the data browser may perform search permission management on the non-consensus nodes.

The architecture of the blockchain system in the technical solutions may be flexible. The data manager may be implemented not in the non-consensus subsystem, but in the distribution center or in parallel to the distribution center, the non-consensus subsystem, and the consensus subsystems. In short, the data browser may provide data search services to and manage search permission for non-consensus nodes regardless of the location of the data browser in the system. As an example, when the data manager is implemented in the distribution center, a first node that is a non-consensus node for a consortium blockchain may send a search request for transaction data to one or more computing devices associated with the distribution center. The one or more computing devices may determine a search permission associated with the first node based on the search request and obtain transaction data corresponding to the search permission from one or more second nodes that are consensus nodes of the consortium blockchain. The one or more computing devices associated with the distribution center may then send the obtained transaction data to the first node.

In one example, the search permission of a non-consensus node may be determined in the following manner: for each non-consensus node, determining a type of the non-consensus node; and according to the type of the non-consensus node, assigning search permission to the non-consensus node.

Here, the type of the non-consensus node may be individual, enterprise, regulatory agency, etc., or may be different credit levels, such as high credit, medium credit, low credit, etc. For example, search permission for an enterprise-type non-consensus node may be transaction data generated by all users served by the enterprise; search permission for a regular individual may be transaction data only related to the individual; and search permission for a regulatory agency may be all transaction data.

In some embodiments, a search request for transaction data sent by a non-consensus node may carry a block, indicating that the non-consensus node wants to search for transaction data corresponding to the block; alternatively, the search request may also carry an identifier of the non-consensus node, indicating that the non-consensus node wants to search for transaction data within the search permission of the non-consensus node.

When the data browser receives the search request for transaction data sent by the non-consensus node, the data browser verifies the search permission of the non-consensus node. When the non-consensus node does not have corresponding search permission (e.g., the non-consensus node does not have permission to search for transaction data corresponding to a block), the data browser rejects the search request. If the non-consensus node has corresponding search permission, the data browser may obtain transaction data corresponding to the search permission from the consensus subsystem corresponding to the search request according to the search permission, and return the obtained transaction data to the non-consensus node.

Furthermore, the data browser may determine what transaction data may be searched by the non-consensus node according to the determined search permission, and then obtain the transaction data from a corresponding consensus subsystem; or may directly send the determined search permission to the corresponding consensus subsystem for the consensus subsystem to return corresponding transaction data according to the search permission.

In the blockchain system shown in FIG. 1A, a blockchain system comprising a distribution center, a non-consensus subsystem, and a plurality of consensus subsystems is created, wherein the non-consensus subsystem comprises a plurality of non-consensus nodes, each of the consensus subsystems comprises a plurality of consensus nodes, and each of the consensus subsystems corresponds to a consortium blockchain network containing the plurality of consensus nodes. As a result, the consensus subsystems can perform consensus validations in different transaction fields. This way, the consensus nodes in the consensus subsystems are responsible for consensus validation, and the non-consensus nodes in the non-consensus subsystem may send a transaction request to the distribution center. The distribution center determines a consensus subsystem in a particular transaction field based on the transaction data comprised in the transaction request. Then, the consensus subsystem performs consensus validation on the transaction request. According to some embodiments, on one hand, only the consensus nodes are responsible for consensus validation, and non-consensus nodes outside the consensus subsystems cannot participate in consensus validation by a consortium blockchain network, thereby improving the security of the blockchain network; on the other hand, the distribution center may interface with the consortium blockchain networks, and non-consensus entities (non-consensus nodes) outside the consortium blockchain network only need to interface with the distribution center, and do not need to interface with a plurality of consortium blockchain networks according to different interfacing protocols, thereby improving the convenience of the blockchain network.

Figure 1B:
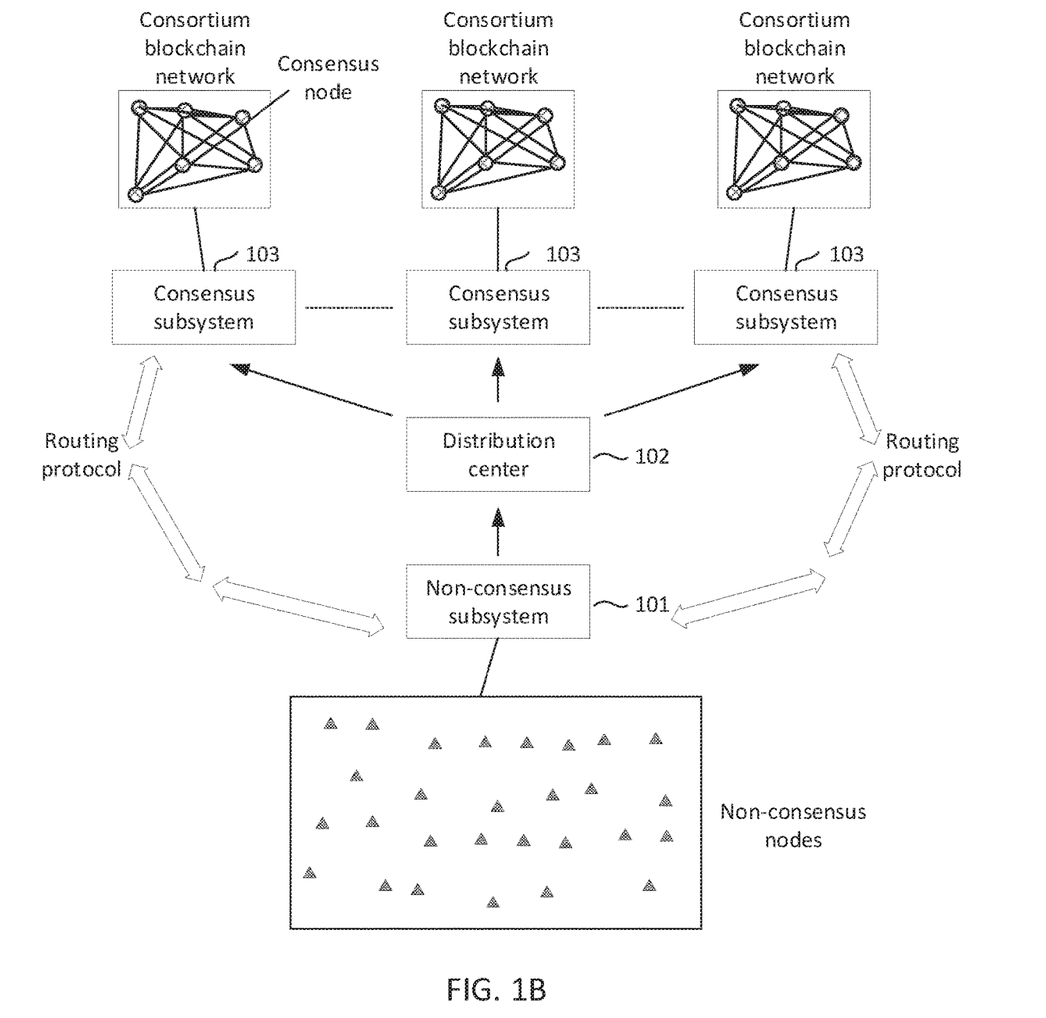
FIG. 1B illustrates a schematic diagram of a blockchain system.

In addition, the functions of the distribution center may be limited only to determining a corresponding consensus subsystem according to a transaction request, or may serve as an agent of data interaction between the consensus subsystem and the non-consensus subsystem. In other words, the consensus subsystem and the non-consensus subsystem may perform data interaction (e.g., sending a block, a transaction digest, transaction data, etc.) without passing through the distribution center but based on a particular routing protocol, as shown in FIG. 1B.

As an example, when the distribution center serves as an agent of data interaction between the consensus subsystem and the non-consensus subsystem, one or more computing devices associated with the distribution center may receive a block or a transaction digest from one or more second nodes that are consensus nodes of a consortium blockchain network and may forward the block or transaction digest to a first node that is a non-consensus node.

Figure 2:
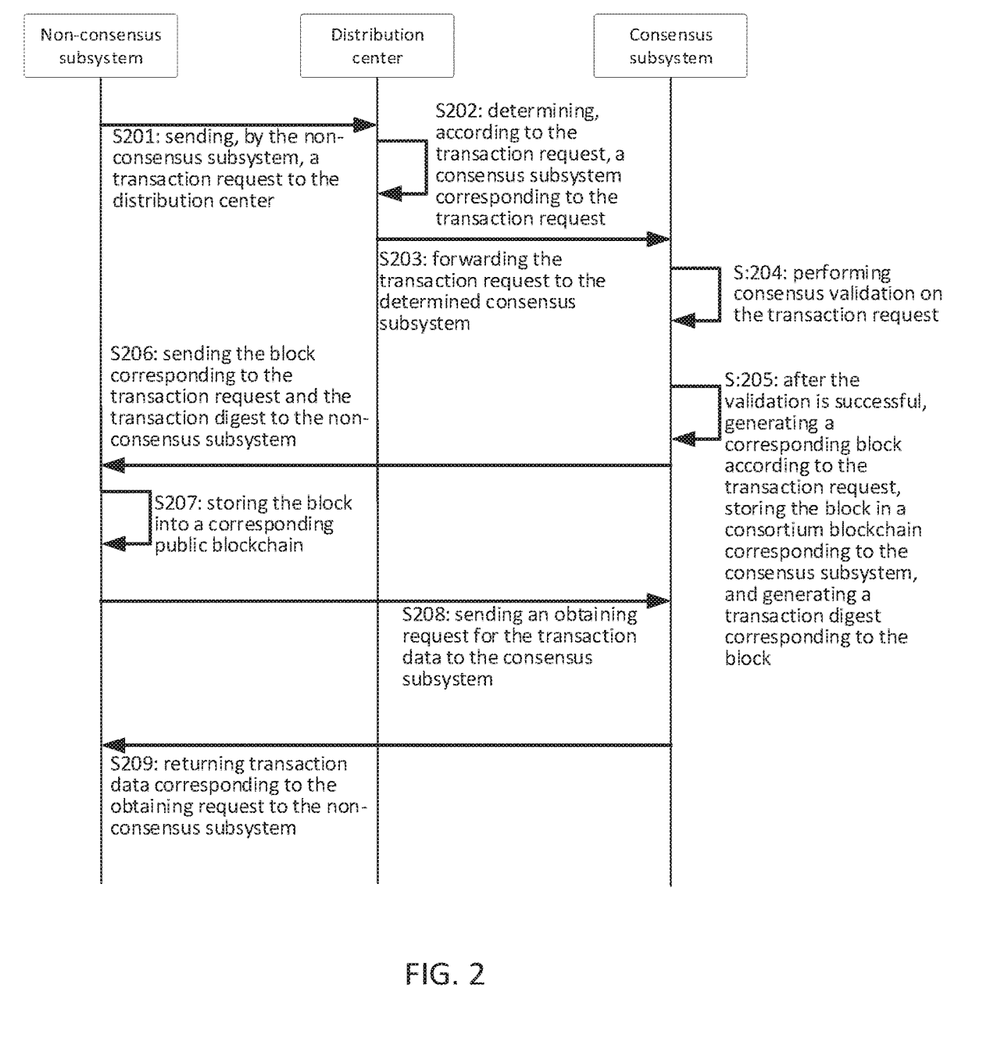
FIG. 2 illustrates a flow chart of a data storing method.

FIG. 2 illustrates a flow chart of a data storing method. The method may comprise a plurality of steps. At step S201, the non-consensus subsystem may send a transaction request to the distribution center. These embodiments are based on the same concepts as the blockchain system shown in FIG. 1A. Explanations of the blockchain system shown in FIG. 1A may be referenced for explanations of relevant concepts. In some embodiments, it may be a non-consensus node in the non-consensus subsystem that sends the transaction request to the distribution center.

At step S202, the distribution center may determine a consensus subsystem corresponding to the transaction request. At step S203, the distribution center may forward the transaction request to the determined consensus subsystem.

The distribution center may receive transactions sent by a plurality of non-consensus nodes for a number of times, and for each transaction request, forward the transaction request to a corresponding consensus subsystem for consensus validation.

The distribution center may serve as an agent of data interaction between the consensus subsystem and the non-consensus subsystem (e.g., sending a block, a transaction digest, transaction data, etc. in subsequent steps), or may not serve as an agent but let the consensus subsystem and the non-consensus subsystem perform data interaction directly.

At step S204, the consensus subsystem may perform consensus validation on the transaction request.

The consensus subsystem performs consensus validation on the transaction request, which is practically to send the transaction request to all consensus nodes comprised in the consensus subsystem to perform consensus validation. A consensus algorithm based on which the consensus nodes perform consensus validation may be the Byzantine Fault Tolerance algorithm or other consensus algorithms or any other suitable algorithm.

At step S205, after the validation is successful, the consensus subsystem may generate a corresponding block according to the transaction request, store the block in a consortium blockchain corresponding to the consensus subsystem, and generate a transaction digest corresponding to the block.

After the validation is successful, the consensus subsystem generates a corresponding block according to the transaction request. In practice, the corresponding block is generated according to a batch of transaction requests that comprise the transaction request, which has been explained above and will not be elaborated.

At step S206, the consensus subsystem may send the block corresponding to the transaction request and the transaction digest to the non-consensus subsystem.

At step S207, the non-consensus subsystem may store the block into a corresponding public blockchain.

At step S208, the non-consensus subsystem may send an obtaining request for the transaction data to the consensus subsystem.

In some embodiments, it may be the non-consensus subsystem that sends the obtaining request to the consensus subsystem, and in one example, it may be the data browser comprised in the non-consensus subsystem that sends the obtaining request to the consensus subsystem.

When the obtaining request comprises search permission of a non-consensus node, the consensus subsystem may determine, according to the search permission, transaction data corresponding to the search permission from transaction data stored in the non-consensus subsystem, wherein the search permission is determined by the non-consensus subsystem according to a search request for the transaction data sent by the non-consensus node.

When the obtaining request comprises a list of identifiers of transaction data, the consensus subsystem may return corresponding transaction data to the non-consensus subsystem according to the list of identifiers.

At step S209, the method may comprise returning transaction data corresponding to the obtaining request to the non-consensus subsystem.

With the data storing method shown in FIG. 2, non-consensus nodes outside the consensus subsystem may be prevented from freely searching for transaction data, while transaction requests submitted by the non-consensus nodes may be allocated in a unified manner, thereby improving the convenience of the blockchain network.

Figure 3:
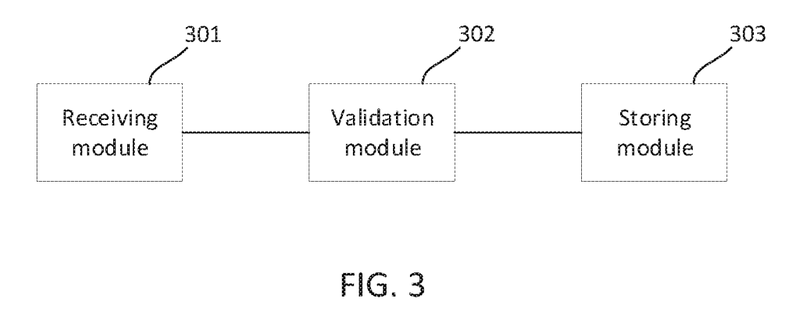
FIG. 3 illustrates a schematic diagram of a data storing apparatus.

Based on the data storing method shown in FIG. 2, the embodiments further provide a corresponding data storing apparatus. As shown in FIG. 3, a blockchain system may comprise a distribution center, a non-consensus subsystem, and a plurality of pieces of the apparatus. The non-consensus subsystem may comprise a plurality of non-consensus nodes. Each piece of the apparatus may comprise a plurality of consensus nodes. The apparatus may comprise a receiving module 301 configured to receive a transaction request forwarded by the distribution center, the transaction request comprising transaction data, a validation module 302 configured to send the transaction request to all consensus nodes in the consensus subsystem for consensus validation, and a storing module 303 configured to, if the validation is successful, generate a corresponding block according to the transaction request and store the block into a consortium blockchain corresponding to the consensus subsystem.

The apparatus further comprises: a sending module configured to, if the validation is successful, send the block corresponding to the transaction request to the non-consensus subsystem, causing the non-consensus subsystem to store the block into a public blockchain corresponding to the non-consensus subsystem.

The apparatus further comprises: a generating module configured to, if the consensus nodes reach a consensus that the transaction request is legitimate, generate a transaction digest corresponding to the block based on the transaction data corresponding to the block, and send the transaction digest to the non-consensus subsystem, causing the non-consensus subsystem to store the transaction digest into the public blockchain such that the transaction digest is available for search by the non-consensus nodes.

The apparatus further comprises: a transaction data management module configured to receive an obtaining request for transaction data from the non-consensus subsystem, and return, according to the obtaining request, transaction data corresponding to the obtaining request to the non-consensus subsystem.

The obtaining request comprises search permission of a non-consensus node, and the search permission is determined by the non-consensus subsystem according to a search request for the transaction data sent by the non-consensus node; and the transaction data management module determines, according to the search permission, transaction data corresponding to the search permission from transaction data stored in the non-consensus subsystem.

Figure 4:
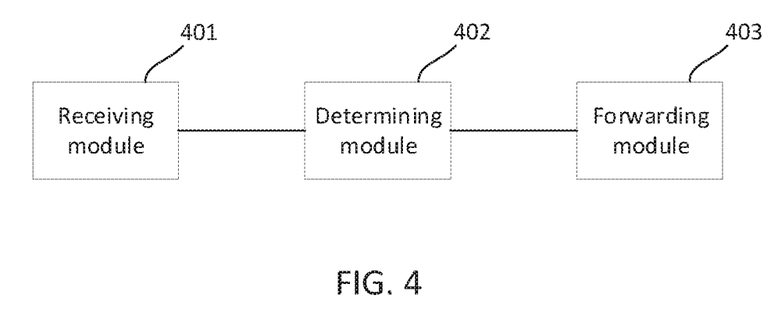
FIG. 4 illustrates a schematic diagram of a data storing apparatus.

Based on the data storing method shown in FIG. 2, the embodiments further provide a corresponding data storing apparatus. As shown in FIG. 4, a blockchain system may comprise the apparatus, a non-consensus subsystem, and a plurality of consensus subsystems. The non-consensus subsystem may comprise a plurality of non-consensus nodes. Each of the consensus subsystems may comprise a plurality of consensus nodes. The apparatus may comprise a receiving module 401 configured to receive a transaction request sent by the non-consensus subsystem, the transaction request comprising transaction data, a determining module 402 configured to determine a consensus subsystem corresponding to the transaction request based on the transaction data comprised in the transaction request, and a forwarding module 403 configured to forward the transaction request to the determined consensus subsystem, causing the consensus subsystem to perform consensus validation on the transaction request and store a block corresponding to the validated transaction request into a consortium blockchain corresponding to the consensus subsystem.

Figure 5:
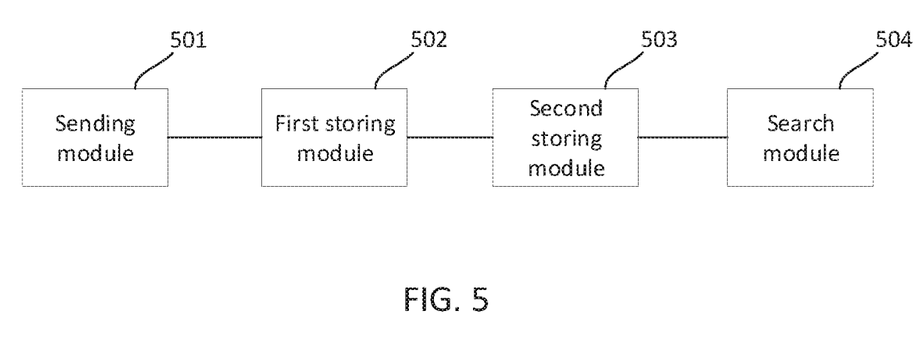
FIG. 5 illustrates a schematic diagram of a data storing apparatus.

Based on the data storing method shown in FIG. 2, the embodiments further provide a corresponding data storing apparatus. As shown in FIG. 5, a blockchain system may comprise a distribution center, the apparatus, and a plurality of consensus subsystems. The apparatus may comprise a plurality of non-consensus nodes. Each of the consensus subsystems may comprise a plurality of consensus nodes. The apparatus may comprise a sending module 501 configured to send a transaction request to the distribution center, the transaction request comprising transaction data, causing the distribution center to forward, based on the transaction data, the transaction request to a consensus subsystem corresponding to the transaction data.

The apparatus further comprises: a first storing module 502 configured to receive a block from the consensus subsystem, and store the block into a public blockchain corresponding to the non-consensus subsystem.

The apparatus further comprises: a second storing module 503 configured to receive a transaction digest corresponding to the block from the consensus subsystem, and store the transaction digest into the public blockchain such that the transaction digest is available for search by the non-consensus nodes.

The apparatus may further comprise a search module 504 configured to receive a search request for transaction data from a non-consensus node, determine search permission of the non-consensus node according to the search request, and return, according to the search permission, transaction data corresponding to the search permission to the non-consensus node.

The search permission of a non-consensus node may be determined in the following manner. For each non-consensus node, a type of the non-consensus node may be determined. Then, search permission may be assigned to the non-consensus node according to the type of the non-consensus node.

The search module 504 obtains, according to the search permission, transaction data corresponding to the search permission from the consensus subsystem corresponding to the search request and returns the obtained transaction data to the non-consensus nodes.

In the 1990s, an improvement to a technology can be obviously differentiated into a hardware improvement (e.g., an improvement to a circuit structure, such as a diode, a transistor, a switch, etc.) or a software improvement (an improvement to a flow of a method). With the technological development, however, many current improvements to method flows may be deemed as direct improvements to hardware circuit structures. Designers almost always obtain a corresponding hardware circuit structure by programming an improved method flow into a hardware circuit. Therefore, it cannot be concluded that an improvement to a method flow cannot be realized with a hardware module. For example, Programmable Logic Device (PLD) (e.g., Field Programmable Gate Array (FPGA)) is such integrated circuit that the integrated circuit's logic functions are determined by a user through programming the device. A designer programs on his/her own to "integrate" a digital system onto one piece of PLD, who does not need to ask a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used right now includes VHDL (Very-High-Speed Integrated Circuit Hardware Description Language) and Verilog. One of ordinary skill in the art should also be aware that it would be very easy to obtain a hardware circuit to implement a logic method flow by using the above HDLs to carry out slight logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) capable of being executed by the (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of a control logic of a memory. One of ordinary skill in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller, and an embedded microcontroller. Therefore, such controller can be deemed as a hardware part, while devices comprised in the controller and configured to achieve various functions may also be deemed as a structure inside the hardware part. Alternatively, devices configured to achieve various functions may even be deemed as both software modules to implement a method and a structure inside a hardware part.

Technical carriers involved in the payment in the embodiments of the specification may comprise, for example, Near Field Communication (NFC), WIFI, 3G/4G/5G, POS terminal card swiping technologies, QR code scanning technologies, barcode scanning technologies, Bluetooth, IR, Short Message Service (SMS), Multimedia Message Service (MMS), etc.

The system, apparatus, module, or unit described in the above embodiments may be implemented by a computer chip or entity, or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any devices in these devices.

For convenience of description, the above device is divided into various units according to functions for description. Functions of the units may be implemented in one or more pieces of software and/or hardware when the embodiments are implemented.

One of ordinary skill in the art should understand that the embodiments disclosed herein may be provided as a method, a system, or a computer program product. Therefore, some embodiments may be implemented as a complete hardware embodiment, a complete software embodiment, or an embodiment combing software and hardware. Moreover, the embodiments may be in the form of a computer program product implemented on one or more computer usable storage media (including, but not limited to, a magnetic disk memory, CD-ROM, an optical memory, etc.) comprising computer usable program codes.

The embodiments are described with reference to flowcharts and/or block diagrams of the method, device (system), and computer program product according to the embodiments disclosed herein. A computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include non-volatile, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device.

It should be further noted that the terms of "including," "comprising," or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements defined by the statement "comprising one . . . " does not exclude that a process, method, commodity, or device comprising the above elements further comprises additional identical elements.

One of ordinary skill in the art should understand that the embodiments of the specification may be provided as a method, a system, or a computer program product. Therefore, the embodiments may be implemented as a complete hardware embodiment, a complete software embodiment, or an embodiment combing software and hardware. Moreover, the embodiments may be in the form of a computer program product implemented on one or more computer usable storage media (including, but not limited to, a magnetic disk memory, CD-ROM, an optical memory, etc.) comprising computer usable program codes.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

The embodiments may be described in a regular context of a computer executable instruction that is executed by a computer, such as a program module. Generally, the program module comprises a routine, a program, an object, a component, a data structure, etc. for executing a particular task or implementing a particular abstract data type. The embodiments may also be practiced in distributed computing environments. In these distributed computing environments, remote processing devices connected via communication networks carry out tasks. In the distributed computing environments, a program module may be located in local and remote computer storage media, including storage devices.

The embodiments in this specification are described in a progressive manner with each embodiment focused on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for the related parts.

The above-described is only embodiments of the specification, which are not used to limit the specification. To one of ordinary skill in the art, the embodiments may have various modifications and changes.

The invention claimed is:

1. A method for storing data, comprising:
   receiving, by one or more computing devices, a transaction request from a first node, the transaction request comprising transaction data;
   determining, by the one or more computing devices based on the transaction data, a blockchain network corresponding to the transaction request from a plurality of blockchain networks connected to the one or more computing devices, wherein the first node is excluded from a consensus process associated with the determined blockchain network;
   forwarding, by the one or more computing devices, the transaction request to the determined blockchain network;
   receiving, by the one or more computing devices from the determined blockchain network, a block generated based on consensus validation on the transaction request; and
   forwarding, by the one or more computing devices, the block to the first node.

2. The method of claim 1, further comprising:
   performing, by the determined blockchain network, the consensus validation on the transaction request forwarded by the one or more computing devices;
   generating, by the determined blockchain network, the block associated with the transaction request; and
   adding, by the determined blockchain network, the generated block to a blockchain associated with the determined blockchain network.

3. The method of claim 1, further comprising:
   storing, by the first node, information associated with the block to a public blockchain.

4. The method of claim 1, further comprising:
   receiving, by the one or more computing devices, a transaction digest corresponding to the block from the determined blockchain network; and
   forwarding, by the one or more computing devices, the transaction digest to the first node.

5. The method of claim 4, further comprising:
   storing, by the first node, information associated with the transaction digest to a public blockchain.

6. The method of claim 1, further comprising:
   receiving, by the one or more computing devices, a search request for transaction data from the first node;
   determining, by the one or more computing devices, a search permission associated with the first node based on the search request;
   obtaining, by the one or more computing devices from the determined blockchain network, transaction data corresponding to the search permission; and
   sending, by the one or more computing devices, the obtained transaction data to the first node.

7. The method of claim 6, wherein the determining a search permission associated with the first node comprises:
   determining a type of the first node; and
   assigning the search permission to the first node based on the determined type.

8. A system for storing data, comprising a processor and a non-transitory computer-readable storage medium storing instructions executable by the processor to cause the system to perform operations comprising:
   receiving a transaction request from a first node, the transaction request comprising transaction data;
   determining, based on the transaction data, a blockchain network corresponding to the transaction request from a plurality of blockchain networks connected to the one or more computing devices, wherein the first node is excluded from a consensus process associated with the determined blockchain network;

forwarding the transaction request to the determined blockchain network;

receiving, from the determined blockchain network, a block generated based on consensus validation on the transaction request; and forwarding the block to the first node.

9. The system of claim 8, wherein the operations further comprise:

validating, by a node associated with the determined blockchain network, the transaction request forwarded by the one or more computing devices;

generating, by the node associated with the determined blockchain network, the block associated with the transaction request; and adding, by the node associated with the determined blockchain network, the generated block to a blockchain associated with the determined blockchain network.

10. The system of claim 8, wherein the operations further comprise:

storing, by the first node, information associated with the block to a public blockchain.

11. The system of claim 8, wherein the operations further comprise:

receiving a transaction digest corresponding to the block from the determined blockchain network; and forwarding the transaction digest to the first node.

12. The system of claim 11, wherein the operations further comprise:

storing, by the first node, information associated with the transaction digest to a public blockchain.

13. The system of claim 8, wherein the operations further comprise:

receiving a search request for transaction data from the first node;

determining a search permission associated with the first node based on the search request;

obtaining, from the determined blockchain network, transaction data corresponding to the search permission; and sending the obtained transaction data to the first node.

14. The system of claim 13, wherein the determining a search permission associated with the first node comprises:

determining a type of the first node; and assigning the search permission to the first node based on the determined type.

15. A non-transitory computer-readable storage medium, configured with instructions executable by one or more processors to cause the one or more processors to perform operations comprising:

receiving a transaction request from a first node, the transaction request comprising transaction data;

determining, based on the transaction data, a blockchain network corresponding to the transaction request from a plurality of blockchain networks connected to the one or more computing devices, wherein the first node is excluded from a consensus process associated with the determined blockchain network;

forwarding the transaction request to the determined blockchain network;

receiving, from the determined blockchain network, a block generated based on consensus validation on the transaction request; and forwarding the block to the first node.

16. The non-transitory computer-readable storage medium of claim 15, wherein the operations further comprise:

validating, by a node associated with the determined blockchain network, the transaction request forwarded by the one or more computing devices;

generating, by the node associated with the determined blockchain network, the block associated with the transaction request; and adding, by the node associated with the determined blockchain network, the generated block to a blockchain associated with the determined blockchain network.

17. The non-transitory computer-readable storage medium of claim 15, wherein the operations further comprise:

storing, by the first node, information associated with the block to a public blockchain.

18. The non-transitory computer-readable storage medium of claim 15, wherein the operations further comprise:

receiving a transaction digest corresponding to the block from the determined blockchain network; and forwarding the transaction digest to the first node.

19. The non-transitory computer-readable storage medium of claim 18, wherein the operations further comprise:

storing, by the first node, information associated with the transaction digest to a public blockchain.

20. The non-transitory computer-readable storage medium of claim 15, wherein the operations further comprise:

receiving a search request for transaction data from the first node;

determining a search permission associated with the first node based on the search request;

obtaining, from the determined blockchain network, transaction data corresponding to the search permission; and sending the obtained transaction data to the first node.

* * * * *